United States Patent Office 2,819,328
Patented Jan. 7, 1958

2,819,328

PROPYLENE POLYMERIZATION WITH PF₅

Herbert C. Brown, West Lafayette, and Willard S. Higley, Hammond, Ind., assignors to Standard Oil Company, Chicago, Ill., a corporation of Indiana No Drawing. Application April 8, 1954
Serial No. 421,950

5 Claims. (Cl. 260—683.15)

This invention relates to a process for the polymerization of propylene. More particularly, our invention is concerned with a process for the polymerization of propylene to produce polymers comprising a substantial or predominant proportion of olefins containing 12 and 15 carbon atoms in the molecule in the presence of small proportions of $PF_5$.

Many catalysts have been suggested for the polymerization of propylene to form a wide variety of polymers. Some of these catalysts, like the low molecular weight alkanesulfonic acids, result in conjunct polymerization rather than true polymerization of propylene (W. Proell and C. E. Adams, Ind. Eng. Chem. 41, 2218–9 (1949)). Other catalysts are known to convert propylene to relatively high molecular weight polymers. In the presence of $BF_3$, propylene was found to react neither at its boiling point nor at ordinary pressure and temperature to any notable degree, but at superatomispheric pressure and room temperature a yellowish oil of very high viscosity was obtained, having the initial boiling point of 120° C./15 mm. and 50% boiling point of 300° C./15 mm. of mercury (Michael Otto, Brenn. Chem. 8, 20 (October 15, 1927), pages 321–3).

One object of this invention is to provide a process for the polymerization of propylene to produce substantial or major yields of propylene tetramers and pentamers having structures which are very desirable for the manufacture of detergent alkylbenzene sulfonates. Another object of this invention is to provide a novel catalyst and process for the polymerization of propylene to produce products of the above-described character. These and other objects of our invention will become apparent from the following description thereof.

In accordance with this invention, propylene can be polymerized to form a product mixture of trimers, tetramers, pentamers, hexamers and small proportions of even higher molecular weight polymers, which mixture contains substantial or major proportions of propylene tetramers and pentamers which are very desirable for the preparation of alkylated aromatic hydrocarbons used in detergent synthesis. The inventive process comprises contacting propylene with between about 0.002 and about 0.008 mol of $PF_5$ per mol of propylene. The molar ratio of $PF_5$ to propylene is a critical variable in determining the polymer product distribution. Suitable polymerization temperatures are, for example, between about 0° C. and 100° C. Usually the polymerization temperature range of about 25° C. to about 75° C. is preferred. The polymerization is usually effected as a homogeneous gas-phase reaction, although the polymerization may be effected, if desired, in the presence of inert hydrocarbon solvents such as pentane, octane, etc. The $PF_5$ is usually employed as such but may, if desired, be employed in the form of an adsorbate thereof on a material of large surface such as activated charcoal or the like.

In order to illustrate our invention, but not unduly to limit the same, the following examples are provided. The propylene employed in the examples was a commercial chemically pure grade. Different samples of propylene were found by dew point determination and by $CaSO_4$ absorption to contain between about 200 and about 500 p. p. m. of water. The $PF_5$ catalyst was prepared by thermal decomposition of benzenediazonium hexafluorophosphate and was separated from nitrogen before introduction into the polymerization reaction vessel. The polymerizations were conducted in a stainless steel autoclave provided with a magnetically-actuated stirrup-type stirrer having a capacity of 250 cc. (a Magne-Dash reactor). The propylene and $PF_5$ were introduced into the autoclave and stirring was continued until the gage pressure was reduced to zero, except in the case of the first run. The polymers produced in the runs tabulated below were washed with aqueous caustic, then with water, and then were dried and distilled in a packed laboratory distillation column. The following data were obtained:

TABLE 1

Propylene polymerization with $PF_5$

| Run No. | Mol Ratio: PF₅/Propene | Propene, g. | Reaction Time, hrs. | Temp., °C. | Initial Press., p. s. i. g. | Polymer Yield, Wt. Percent of Propene Charged | Product Distribution, Wt. Percent | | | | |
|---|---|---|---|---|---|---|---|---|---|---|---|
| | | | | | | | $C_9$ | $C_{12}$ | $C_{15}$ | $C_{18}$ | $C_{18+}$ |
| 1 | 0.0014 | 55 | 6 | 23 | 210 | 4 | | | | | |
| 2 | 0.0026 | 59 | 6 | 23 | 210 | 100 | 18.3 | 60.6 | 10.8 | 3.7 | 6.5 |
| 3 | 0.0028 | 56 | 1.5 | 75 | 480 | 100 | 20.9 | 37.7 | 13.4 | 13.8 | 14.2 |
| 4 | 0.0057 | 78 | 20 | 23 | 500 | 100 | | 26 | 24 | 23 | 27 |
| 5 | 0.0078 | 55 | 3 | 23 | 210 | 100 | | 8.9 | 34.4 | 26.0 | 30.7 |
| 6 | 0.0116 | 240 | 4 | 23 | 190 | 100 | | | 9 | 13.5 | 75 |
| 7 | 0.0158 | 66 | 0.5 | 23–47 | 260 | 100 | | 1.7 | 8.9 | 9.3 | 80 |

It will be noted from the table that when 0.0014 mol of $PF_5$ was employed per mol of propylene, substantially no polymerization was obtained at about room temperature. However, when the $PF_5$/propylene molar ratio was increased to 0.0026, complete polymerization of propylene was obtained within a reasonably short time and the major proportion of the product was propylene tetramer and pentamer, accompanied by small proportions of higher molecular weight propylene polymers (run 2). Increasing the reaction temperature to 75° C. shortened the reaction period, but the yield of propylene tetramer and pentamer was somewhat reduced at the expense of an increased yield of propylene hexamer and higher boiling polymers (run 3). An increase in the $PF_5$/propylene molar ratio above about 0.008 results in substantial increases in the yield of propylene hexamer and higher molecular weight polymers (comparison of runs 6 and 7 with runs 5 and 4).

The propylene tetramer from run 2 was shown by bromination to be composed of substantially 100% olefin. An infrared analysis thereof indicated only about 10% of terminal vinyl olefins ($R_2C{=}CH_2$) and no olefins having the structure $RCH=CH_2$, wherein R represents an alkyl group.

The propylene tetramer and pentamer of run 2 were blended in the approximate proportion of 74% tetramer and 26% pentamer (boiling range, 185° C. at 760 mm. to 144° C. at 40.5 mm. of mercury, $n_D^{20}$ 1.4428). This mixture of propylene polymers was employed for the alkylation of benzene, employed in a molar ratio of 7/1, in the presence of 12 weight percent of anhydrous aluminum chloride and 12 weight percent of anhydrous HCl, based on the benzene. The polypropylenes fraction was added slowly to the mixture of benzene and catalysts while maintaining a temperature below 60° C. and the reaction mixture was stirred for one hour following completion of olefin addition. The lower layer of catalyst complex was withdrawn and the upper benzene alkylate layer was neutralized with 10 weight percent aqueous caustic, washed with water, dried and distilled to give the following product distribution:

TABLE 2

*Product distillation of detergent alkylate*

| Product | Boiling Range, °F. | Wt. Percent |
|---|---|---|
| Benzene | 75 to 175 | 65.6 |
| Polypropylene+lower alkylbenzene | 175 to 403 | 7.5 |
|  | 200 to 308 (20 mm. Hg) |  |
| $C_{12}$-$C_{15}$ alkylbenzene | 309 to 331 (20 mm. Hg) | 20.4 |
|  | 218 to 248 (1 mm. Hg) |  |
| Dialkylated benzene and residue | 248 to 342 (1 mm. Hg) | 6.5 |

The $C_{12}$–$C_{15}$ alkylated benzene was characterized by a refractive index ($n$ 20/D) of 1.4878; density at 23.4° C., 0.878; specific dispersion, 133.

The $C_{12}$–$C_{15}$ alkylbenzene was sulfonated with 1.32 weight percent oleum (20%) added dropwise to the stirred alkylbenzene solution at a temperature below 25° C. The reaction mixture was aged for two hours at 24° C. Water, in the proportion of 17.7 weight percent, based on oleum used, was added slowly keeping the temperature below 60° C. The lower acid phase was removed, the upper sulfonic acid layer was poured into 30% aqueous caustic and ice, and the resulting mixture was neutralized with caustic to a pH of about 7.5. The mixture was diluted with water and extracted with n-pentane to remove unsulfonated oil. The mixture was then dried and extracted with absolute ethanol to remove the detergent. The sulfonation yield was 84.5%.

Solutions of the detergent were made up in different concentrations in distilled water and in 176 p. p. m. hard water (1.5665 g. $CaCl_2 \cdot H_2O$ and 1.7365 g. $MgSO_4 \cdot 7H_2O$ in 5 gal. distilled $H_2O$) to determine the wetting and rewetting properties of the detergent solutions by means of the Draves-Clarkson wetting test. The results of this test are given in Table 3.

TABLE 3

*Wetting and rewetting time of detergent solutions by Draves-Clarkson test*

|  | Wetting Time (sec.) | Rewetting Time (sec.) |
|---|---|---|
| Wt. Percent Conc. in 176 p. p. m. Hard Water: |  |  |
| 0.2 | 3.9 | 31.5 |
| 0.1 | 6.3 | 83.9 |
| 0.05 | 14.8 | 420.0 |
| 0.025 | 100.0 | 7,480.0 |
| Wt. Percent Conc. in Distilled Water: |  |  |
| 0.2 | 2.7 | 40.8 |
| 0.1 | 6.1 | 107.2 |
| 0.05 | 14.1 | 430.0 |
| 0.025 | 95.0 | 2,480.0 |

The rewetting times were determined in distilled water, using the same cotton skeins used in the wetting tests which were allowed to dry before running the rewetting tests.

From the foregoing data it will be apparent that the process of the present invention provides a facile and economical process for the polymerization of propylene with very small quantities of $PF_5$ to produce large yields of propylene tetramers and pentamers which are extremely desirable commercial materials. Although we have described and illustrated one end use for the propylene tetramer and pentamer produced by our process, it will be apparent that these products are susceptible of many other uses. Thus the propylene trimers, tetramers, pentamers, etc. produced by the present process may be subjected to the well known oxoation reactions to produce aldehydes, alcohols and various derivatives, such as carboxylic acids, which may be made from the alcohols. Also, the propylene polymers of the present invention may be sulfated or sulfonated by known means to produce wetting agents and they may be esterified by various techniques known for the esterification of olefins. These and many other uses will suggest themselves to one skilled in the art.

In commercial processing in which it is desired to maximize the yields of propylene tetramer and/or pentamers, it is desirable to recycle lower molecular weight propylene polymers such as the propylene trimer to the reaction zone.

Although we have described in detail the polymerization of propylene, it will be apparent that this charging stock may contain other olefinic hydrocarbons, such as ethylene, n-butenes, isobutylene, etc. when it is desired to produce modified polymers.

Having thus described our invention, what we claim is:

1. The process which comprises contacting propylene with a polymerization catalyst consisting essentially of $PF_5$ in a proportion between about 0.002 and about 0.008 mol per mol of propylene under polymerization conditions and separating polymerization products comprising substantial proportions of tetramers and pentamers of propylene thus produced.

2. The process which comprises contacting propylene with a polymerization catalyst consisting essentially of $PF_5$ in a proportion between about 0.002 and about 0.008 mol per mol of propylene at a polymerization temperature between about 0° C. and about 100° C. and separating polymerization products comprising substantial proportions of tetramers and pentamers of propylene thus produced.

3. The process of claim 2 wherein the polymerization temperature is between about 25° C. and about 75° C.

4. A process for the conversion of propylene to a major proportion of a tetramer of propylene, which process comprises contacting a polymerization catalyst consisting essentially of $PF_5$ with propylene in a molar ratio of about 0.0025 at about 25° C. for a period sufficient to effect substantial polymerization of propylene, and separating polymerization products thus produced.

5. The process which comprises contacting propylene with a polymerization catalyst consisting essentially of $PF_5$ in a proportion between about 0.002 and about 0.008 mol per mol of propylene at a polymerization temperature between about 25° C. and about 75° C. and a pressure between about 200 p. s. i. and about 500 p. s. i., and separating polymerization products comprising substantial portions of tetramers and pentamers of propylene thus produced.

References Cited in the file of this patent

UNITED STATES PATENTS

| 2,084,501 | Otto et al. | June 22, 1937 |
| 2,421,950 | Linn | June 10, 1947 |
| 2,528,876 | Evering et al. | Nov. 7, 1950 |